April 1, 1958   J. MONDRY   2,828,915
SLIDE RULE
Filed Nov. 13, 1956
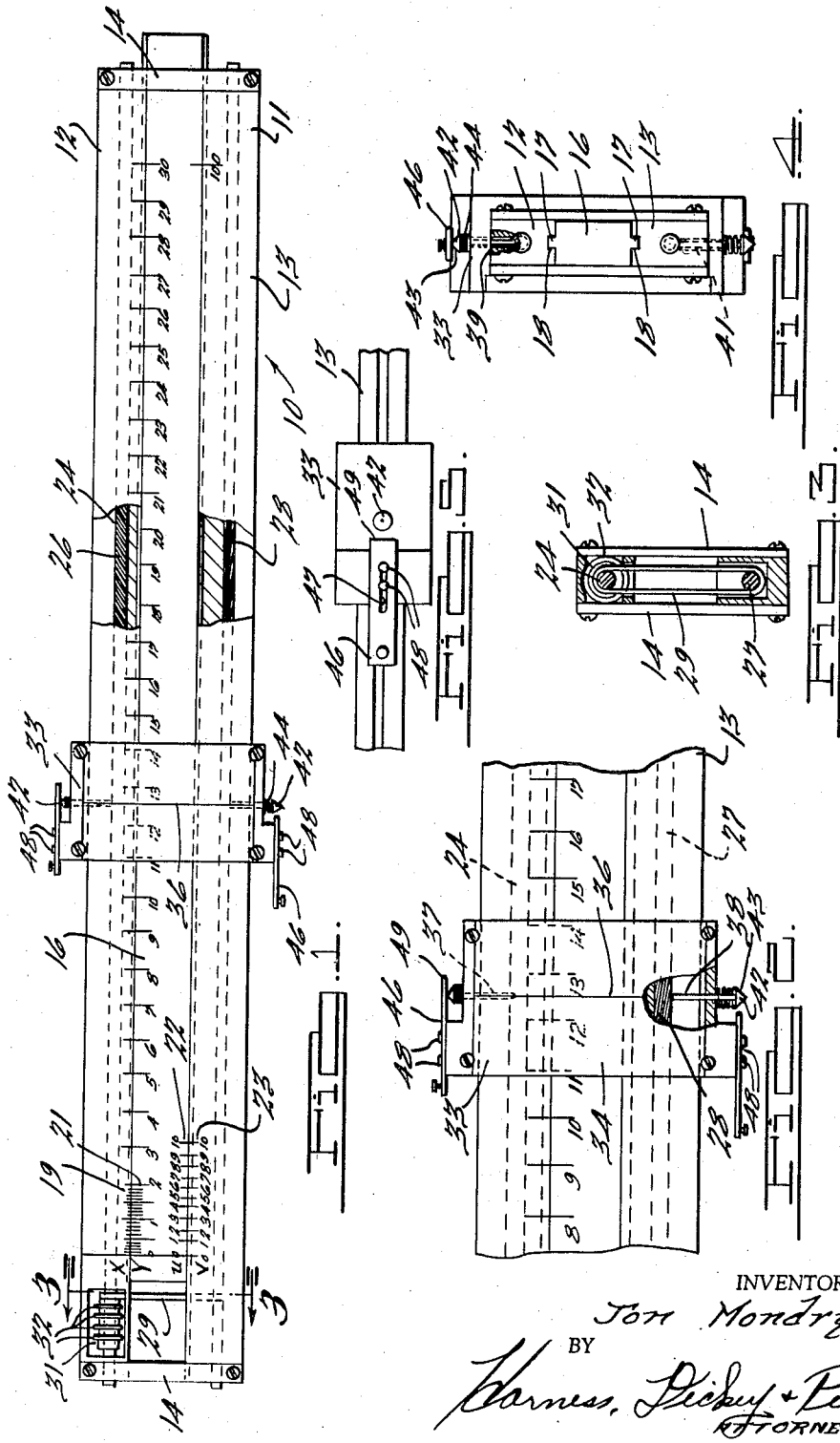
INVENTOR.
Jon Mondry
BY
Harness, Dickey & Pierce
ATTORNEYS 2,828,915

SLIDE RULE

Jon Mondry, Detroit, Mich.

Application November 13, 1956, Serial No. 621,625

9 Claims. (Cl. 235—70)

This invention relates generally to computing devices and more particularly to a direct reading adding and subtracting slide rule.

An object of this invention is to provide an improved slide rule.

Another object of this invention is to provide a slide rule which is operable in adding or subtracting to indicate the final answer directly without requiring any interpolation.

A further object of this invention is to provide a slide rule in which a mechanical counter is operated by the usual slide rule runner movement, for operation of the slide rule to indicate a final computation answer directly on the counter.

Still a further object of this invention is to provide a slide rule which is simple in construction, economical to manufacture and efficient in operation in indicating directly the result of an adding and/or subtracting operation.

Further objects, features and advantages of this invention will become apparent from a consideration of the following description when taken in connection with the accompanying drawing in which:

Fig. 1 is a side elevational view of the slide rule of this invention with some parts broken away to better illustrate the slide rule construction;

Fig. 2 is an enlarged fragmentary side elevational view of a portion of the slide rule illustrated in Fig. 1;

Fig. 3 is a transverse sectional view looking along the line 3—3 in Fig. 1;

Fig. 4 is an end view of the slide rule of this invention, with some parts broken away and other parts shown in section for the purpose of clarity; and Fig. 5 is a detail view of one end of the runner in the slide rule of this invention.

With reference to the drawing, the slide rule of this invention, indicated generally at 10, is illustrated in Fig. 1 as including a body member 11 having a pair of transversely spaced portions 12 and 13 connected at their ends by straps 14. A longitudinally extended slide member 16 positioned between the body member portions 12 and 13, has a pair of oppositely extended tongues 17 (Fig. 4) received in corresponding grooves 18 formed in the body member portions 12 and 13 to provide for a slidable support of the slide member 16 on the body member 11. The body member portion 12 and the adjacent side of the slide member 16 are provided with matching "X" and "Y" scales 19 and 21, respectively, illustrated as extending from "0" to "30" and calibrated in tenths between adjacent numbers. Likewise, the opposite side of the slide member 16 and the body member portion 13 are provided with matching "U" and "V" scales 22 and 23 illustrated as extending from "0" to "100." A shaft 24 provided with a plurality of spiral grooves 26 extends longitudinally of and is positioned within the body member portion 12. A similar shaft 27, likewise provided with a plurality of parallel spiral grooves 28 of a smaller pitch than the groove 26 extends longitudinally of and is positioned within the body member portion 13.

The shafts 24 and 27 are connected for concurrent rotation by a belt 29 (Figs. 1 and 3) extended about the shafts 24 and 27 at a position to the left of the slide member 16 as viewed in Fig. 1. A mechanical counter 31 (Fig. 1) is connected directly to the shaft 24 for operation in response to rotation of the shaft 24 and has manually operable disks 32 for returning the counter 31 to zero.

A runner 33 (Figs. 1, 2 and 4) slidably mounted on the body member 11 has the usual transparent viewing side 34 provided with a hair line 36 positioned opposite the side of the body member 11 provided with the "X," "Y," "U" and "V" scales. At its transversely opposite ends, the runner 33 supports a pair of pins 37 and 38 corresponding to the shafts 24 and 27, respectively, and extended inwardly of the body member 11 through slots 39 and 41 in the body member portions 12 and 13, respectively, for engagement with the shafts 24 and 27. Each of the pins 37 and 38 has a head 42 provided with an inclined surface 43. A spring 44 is positioned about each of the pins 37 and 38 and extends between and is secured to a corresponding pin head 42 and the runner 33 for biasing the pins 37 and 38 out of engagement with the corresponding shafts 24 and 27.

Associated with each of the pins 37 and 38 is a locking plate 46 mounted on an adjacent end of the runner 33 for locking a pin 37 or 38 in a position in engagement with the corresponding shaft 24 or 27. Each plate 46 has a slot 47 through which a pair of screws 48 carried by the runner 33 are extended to provide for sliding movement of the plate 46 toward and away from the head 42 of a corresponding pin 37 or 38.

On movement of a plate 46 toward the corresponding pin head 42, the end 49 of the plate 46 engages the inclined head surface 43. As a result, on continued movement of the plate 46, the pin 37 or 38 is moved toward the corresponding shaft 24 or 27, respectively, to a final position in which the plate 46 overlies the head 42 and locks the pin 37 or 38 in a shaft engaging position in which the pin extends into the shaft groove 26 or 28. Such a position is illustrated for the pin 37 in Fig. 1. On sliding movement of a locking plate 46 in an opposite direction to a position in which the end 49 thereof is in a clearance relation with the corresponding pin head 42, the spring 44 provides for an automatic disengagement of the pin 37 or 38 from the corresponding shaft 24 or 27, respectively.

It is seen, therefore, that on sliding movement of the runner 33, with the pin 37 received in a groove 26 for the shaft 24, the shaft 24 is rotated. On movement of the runner toward the right, as viewed in Fig. 1, the numbers on the counter 31 are progressively advanced in response to rotation of the shaft 24. Conversely, on movement of the runner 33 toward the left, as viewed in Fig. 1, the numbers on the counter 31 are progressively retracted. By virtue of the assembly of the belt 29 with the shafts 24 and 27, movement of the runner 33 with the pin 38 received in a groove 28 in the shaft 27 has a similar effect on the counter 31.

The counter 31 is initially assembled in the slide rule 10 such that on movement of the runner 33 from a position in which the hair line 36 is on zero for the "X" scale, and the pin 37 is engaged with the shaft 24, to a position in which the hair line 36 is at a position on the "X" scale indicated on the scale by the numeral "1," the shaft 24 is rotated an amount necessary to provide for a "10" advancement of the counter 31. Similarly, the pitch of the grooves 28 on the shaft 27 is such that on movement of the runner from "0" to "10" on the "U" and "V" scales, with the pin 38 held in the groove 28, the shaft 24 is rotated an amount necessary to provide for a "1" advancement of the counter 31. When the runner movement is in the opposite direction, namely, to the left in Fig. 1, the indicated number on the counter 31 is retracted a similar amount. The slide member 16 is used in the usual slide rule manner to measure the desired movement of the runner 33 with the "Y" and "U" scales.

By virtue of the different pitches of the grooves 26 and 28 in the event both pins 37 and 38 are engaged with the corresponding grooves 26 and 28, respectively, which event never occurs intentionally in normal operation of the slide rule 10, the runner 33 is locked. Such locking positively prevents accidental rotation of both the shafts 24 and 27 at the same time.

In the operation of the slide rule 10, a range of either "0–300" or "0–3000" may be assigned to the XY scales. In other words, when the XY scales are assigned a range of "0–300" the numeral "1" on each scale represents "10" on the counter 31. When a range of "0–3000" is assigned, the numeral "1" on the XY scales represents "100" on the counter 31. In both cases the counter 31 reads "10" but in the first case this reading represents "10" and in the second case the reading represents "100."

The narrow range of "0–300" is normally used when a column of two and three digit numbers less than "300" are involved. There is more chance of going off scale when the narrow range is used but to bring the runner 33 back on scale it is only necessary to utilize a finger motion to retract the pin 37 and manually return the runner 33 to a zero position at which time the pin 37 is re-engaged with the shaft 24 at a groove 26 and the operation is continued. In the earlier adding and subtracting slide rules which have come to my attention it has been difficult to bring the runner "back on scale" after the calculation has extended past the right hand end of the rule. In most cases, a mental or written calculation has been required.

The advantage of a narrow range assignment to the XY scales is that the final calculation is read directly on the counter 31 and no use of the "UV" scales is required. In a calculation in which the wider "0–3000" range is assigned, the "UV" scales are used and the units place in the answer is read from the "V" scale.

As an example of the operation of the slide rule 10, assume that the numbers "204," "37" and "851" are to be added and the numeral "699" subtracted from the added total. To illustrate the use of all the scales let us further assume that a "0–3000" range is assigned to the XY scales. The counter disks 32 are manually manipulated to provide for a zero indication on the counter 31. The locking plates 46 are moved to positions in a clearance relation with the pin heads 42 so that both pins 37 and 38 are retracted by their corresponding springs 44 and the runner 33 is moved to a position in which the hair line 36 is on zero for the "X" scale. The locking plate 46 for the pin 37 is then manipulated to lock the pin 37 in a position received in a groove 26, being sure that the plate 46 for the pin 38 remains in a clearance relation with the pin 38. By manipulating the slide member 16, the runner 33 is progressively moved toward the right in Fig. 3 to add the numerals "200," "30" and "850," so that the hairline 36 is opposite "1080" on the "X" scale. In response to such movement of the runner 33, the shaft 24 is rotated to provide for the numeral "108" on the counter 31. The numeral "690" is then subtracted by manipulating the slide member 16 so that "690" on the "Y" scale is positioned opposite the hairline 36, after which the runner 33 is moved to the left as viewed in Fig. 1 to a position in which the hairline 36 is opposite zero on the "Y" scale. In response to such movement, the counter 31 is retracted so that the numeral "39" is indicated thereon.

Thus far, only the tenths and hundredths places in the final answer have been calculated and only these places show on the counter 31. In order to calculate the units place answer the locking plate 46 for the pin 37 is moved to a position in a clearance relation with the pin 37 so that the spring 44 therefor provides for retraction of the pin 37. The runner 33 is then moved to a position in which the hairline 36 is opposite zero on the "V" scale and the locking plate 46 for the pin 38 is moved to a position in which the pin 38 is moved into a groove 28. The slide member 16 is then manipulated in the usual manner so that the "U" scale is utilized with the runner 33 and the "V" scale to add the numerals "4," "7" and "1" and subtract the numeral "9." At the end of such manipulation, the hairline 36 is opposite the numeral "3" for the "V" scale and the total on the counter 31 has not been changed. The final reading, representing the result of the above evaluation, therefore, is "393." If the units place calculation had been such that the hairline 36 finally rested on "13" instead of "3" the counter 31 would have been advanced by "1" to show a final figure of "40" and the answer would, therefore, be "403." Thus the last digit in the final "V" scale reading represents the units place in the final answer. In the last example the "10" portion of the "13" was registered on the counter by the belt 29 so that only the "3" portion is regarded in the final answer.

To solve the above problem by assigning a range of "0–300" to the "XY" scales, first manually set "851" on the counter 31 by manipulating the disks 32. Add "204" and "37" in the usual way so that the counter 31 reads "1092" and the runner hairline 36 is on "241" on the "X" scale. Manually subtract "600" on the counter 31 by manipulating the two appropriate disks so that the counter then reads "492." The "99" remainder from "699" is then subtracted by manipulating the "X" and "Y" scales in the usual way so that the final answer "393" is read on the counter 31.

From the above description it is seen that the slide rule 10 of this invention combines the usual slide rule body 11 and slide member 16 with the mechanical counter 31 which is operated in response to travel of the runner 33 for indicating the result of an adding and/or subtracting operation directly on the counter 31. The answer either appears completely on the counter or on the counter and the "V" scale together. Since the hairline 36 is at all times aligned with the calibration lines of either the "X" and "Y" or "U" and "V" scales, no interpolation is required in the use of the slide rule 10. As a result, a reliable and accurate answer is always obtainable. By virtue of the assembly of the slide rule 10 in a form usually expected of a slide rule, it is conveniently combined with the usual slide rule scales for multiplying, dividing, etc., by forming the "X," "Y," "U" and "V" scales for adding and subtracting on one side of a slide rule body, having the usual multiplying, dividing, etc. scales on the other side. The runner 33 is readily brought "back on scale" by virtue of the coaction of the pins 37 and 38 and the shafts 24 and 27. Furthermore, an infinite list of numbers can be added or subtracted with the slide rule 10, the only limitation being the capacity of the counter 31. The multi-groove character of the shafts 24 and 27 insures an engagement of a pin 37 or 38 with a groove 26 or 28, respectively, at any position of the runner 33.

Although the invention has been described with respect to a preferred embodiment thereof, it is to be understood that it is not to be so limited, since changes can be made therein which are within the scope of the invention as defined by the appended claims.

What is claimed is:

1. A direct reading adding and subtracting slide rule comprising a pair of interfitting members arranged for relative movement and provided with matching scales, a runner slidably mounted on said members, a counter mounted on one of said members, and means on said one member connected to said counter for operating the counter in response to movement of said runner longitudinally of said one member in amounts measured by said scales.

2. A direct reading adding and subtracting slide rule comprising a pair of elongated interfitting members arranged for relative longitudinal movement, a runner slidably mounted on said members, a counter mounted on one of said members, a shaft mounted on said one member and connected to said counter for operating the counter in response to rotation of said shaft, and coacting means on said shaft and said runner providing for rotation of said shaft in response to movement of said runner longitudinally of said members, with said rotation being in a predetermined relation to movement of said runner as measured by said scales.

3. A direct reading adding and subtracting slide rule comprising a pair of elongated interfitting members arranged for relative longitudinal movement, a runner slidably mounted on said members, a counter mounted on one of said members, a shaft on said one member connected to said counter for operating the counter in response to rotation of said shaft, and coacting pin and groove means on said shaft and said runner providing for rotation of said shaft on movement of said runner longitudinally of said one member.

4. A direct reading adding and subtracting slide rule comprising a longitudinally extended body member having a pair of transversely spaced portions provided with scales, a slide member slidably mounted on said body member for movement longitudinally there of between said portions, said slide member having a pair of scales thereon corresponding to and positioned opposite the scales on said body member, a pair of shafts extended longitudinally through said body member portions, a runner slidably mounted on said body member, a counter mounted on said body member and operatively associated with said shafts for operation in response to rotation thereof, and coacting means on said runner and said shafts providing for rotation of said shafts in predetermined amounts in response to movement of said runner measured distances longitudinally of said body member.

5. A direct reading adding and subtracting slide rule comprising a longitudinally extended body member having a pair of transversely spaced portions provided with scales, a slide member slidably mounted on said body member for movement longitudinally thereof between said portions, said slide member having a pair of scales thereon corresponding to and positioned opposite the scales on said body member, a pair of shafts extended longitudinally through said body member portions, a runner slidably mounted on said body member, a counter mounted on said body member and connected directly to one of said shafts for operation in response to rotation thereof, means extended between said shafts providing for concurrent rotation thereof and coacting pin means on said runner and spiral groove means on said shafts providing for rotation of said shafts in response to movement of said runner longitudinally of said body member.

6. A direct reading adding and subtracting slide rule comprising a longitudinally extended body member having a pair of transversely spaced portions provided with scales, a slide member slidably mounted on said body member for movement longitudinally thereof between said portions, said slide member having a pair of scales thereon corresponding to and positioned opposite the scales on said body member, a pair of shafts extended longitudinally through said body member portions, a runner slidably mounted on said body member and provided with a pair of pin members corresponding to said shafts, each pin member being mounted for movement into engagement with a corresponding one of said shafts, with each of said shafts having multi-spiral grooves formed thereon for receiving a pin member to provide for rotation of a shaft in response to sliding movement of said runner with a pin member thereon received in a groove for said shaft, with each of said multi-spiral grooves being formed to provide for rotation of the shaft therefor in a predetermined measured relation with the scale corresponding thereto, and a counter mounted on said body member and operatively associated with said shafts for operation in response to rotation thereof.

7. A direct reading adding and subtracting slide rule comprising a body member, a shaft mounted on said body member and provided with spiral groove means, a runner mounted for sliding movement on said body member, a pin member carried by said runner for selective reception in said groove means to provide for rotation of said shaft on sliding movement of said runner with said pin member received in said groove means, a numbered slide member mounted for sliding movement on said body member for measuring said runner movement, and counter means connected to said shaft for operation in response to shaft rotation for visually indicating the movement of said runner in numbers related to said scale.

8. A direct reading adding and subtracting slide rule comprising a body member, a counter mounted on said body member, a first shaft on said body member connected directly to said counter to provide for operation of the counter in response to rotation of said shaft, a second shaft on said body member, means connected to and extended between said shafts providing for rotation of said first shaft in response to rotation of said second shaft, a slide member having a pair of scales thereon corresponding to said shafts and slidably mounted on said body member, a runner slidably mounted on said body member, and coacting means on said runner and said shafts providing for selective rotation of said shafts in response to sliding movement of said runner, with rotation of a shaft being in a predetermined proportional relation with the scale corresponding thereto.

9. A direct reading adding and subtracting slide rule comprising a body member provided with a numbered scale, a shaft mounted on said body member and provided with a spiral groove, a runner mounted for sliding movement on said body member, a slide member mounted for sliding movement on said body member and provided with a scale matching said body member scale for measuring said runner movement, counter means connected to said shaft for operation in response to shaft rotation for visually indicating the movement of said runner in numbers related to said scales, and means for rotating said shaft on movement of said runner in amounts proportional to the amount of runner movement.

No references cited.